Figure 1:
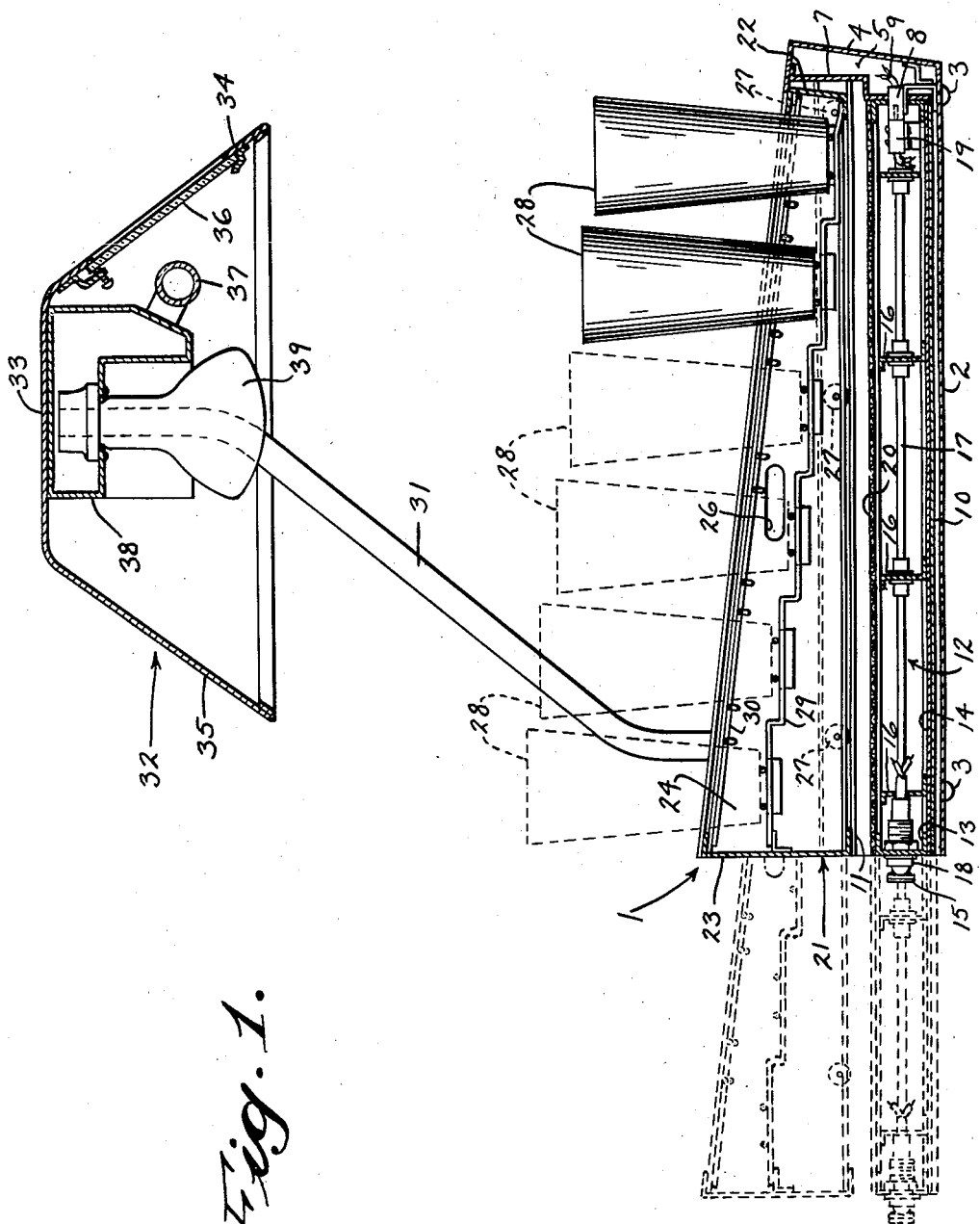

Dec. 9, 1958 H. J. FITZGERALD 2,863,979
FOOD WARMER
Filed Feb. 27, 1957 3 Sheets-Sheet 2

INVENTOR
Harold J. Fitzgerald
BY Quarles, Fox, Seidel,
Bateman & Hoar
ATTORNEYS

Dec. 9, 1958      H. J. FITZGERALD      2,863,979
FOOD WARMER
Filed Feb. 27, 1957      3 Sheets-Sheet 3
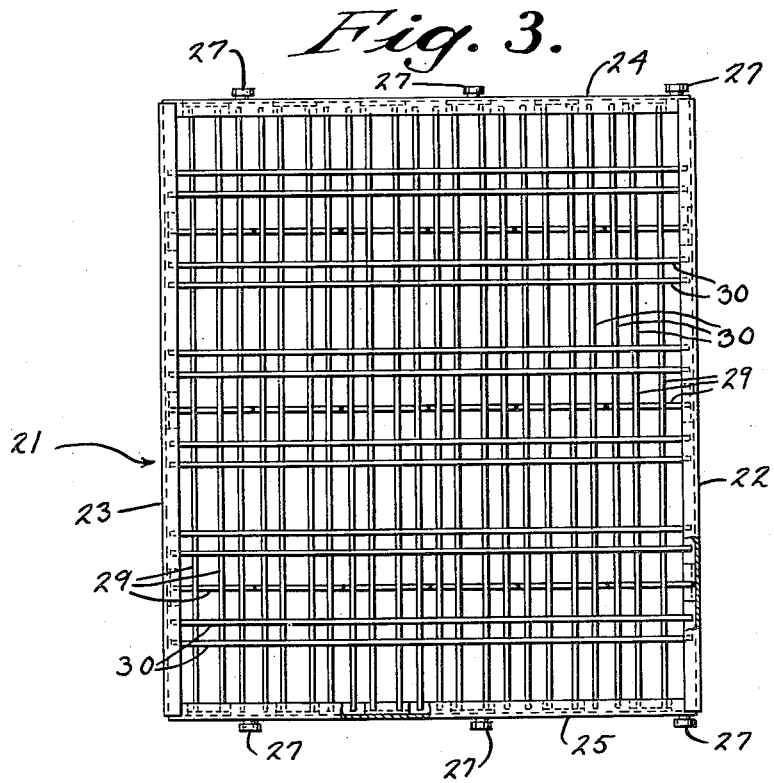
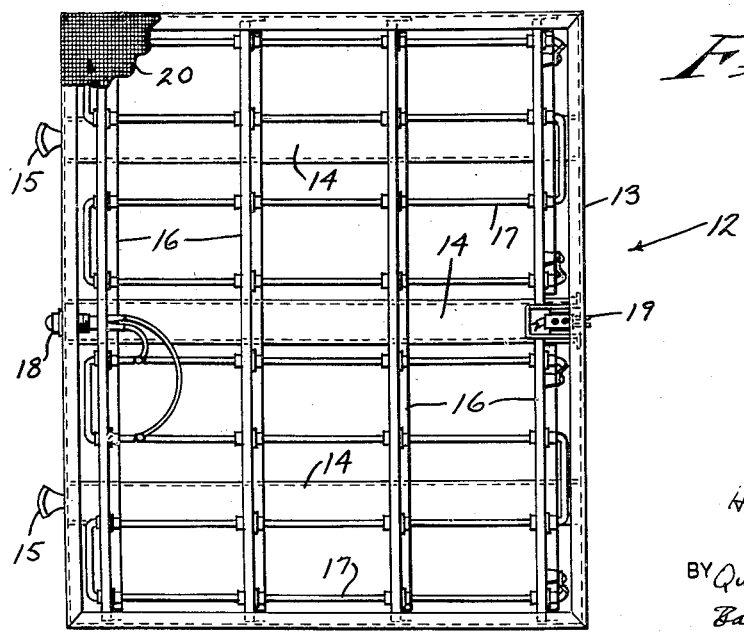
INVENTOR
Harold J. Fitzgerald
BY Quarles, Fox, Seidel,
Bateman & Hoar
ATTORNEY United States Patent Office 2,863,979
Patented Dec. 9, 1958

2,863,979

FOOD WARMER

Harold J. Fitzgerald, Whitefish Bay, Wis., assignor to Superdisplay, Inc., Milwaukee, Wis., a corporation of Wisconsin Application February 27, 1957, Serial No. 642,895

6 Claims. (Cl. 219—35)

This invention relates to food warming apparatus and it more particularly resides in a warmer for food-stuffs packaged in relatively tall containers, of generally elongated cuplike configuration, in which there is a lower base with raised side walls that forms a heat box open at the top, the heat box having a grid for receiving and holding the containers with the bottom portions within the base and the upper portions extending upwardly from the base, and there being both a heater in the bottom of the heat box that is beneath the containers and a second heater that delivers radiant energy poised above the containers.

The invention finds particular use in heating prepared starchy food products, such as popped corn, which are of relatively poor heat conductivity. Such food products are conveniently merchandised in single servings contained in paper cups, and as such are offered to prospective purchasers who, through self-service, remove the foodstuff from a warming apparatus. It is most difficult to maintain such foodstuffs, served in such manner, at warming temperatures that render the food most palatable. Heat applied in usual manner is readily lost to the atmosphere, and intense local heating can raise temperatures of the serving apparatus to levels that customers may be injured upon inadvertently coming into contact therewith.

The invention solves the problem of retaining popped corn, and the like, in individual servings at warming temperatures, without unwanted overheating of exposed portions of the serving apparatus. A radiant heat source is located above the food product and the energy delivered thereby which does not strike the foodstuffs passes to the interior of an underlying base of some substantial depth. The heat energy not imparted to the food product is then evolved within the base, which consequently serves as a heat box that captures and releases heat, with a gentle flow of warmed air moving upwardly along the sides of the containers holding the food product. As an aid to the evolution of heat within the confines of the base a second local heater may be located therein.

It is an object of this invention to provide a food warmer for heating foodstuffs in elongated cups of individual servings.

It is another object of this invention to provide a food warmer for serving foodstuff in an open traylike structure that facilitates self-service.

It is another object of this invention to provide a food warmer for uniformly heating food products that are relatively poor heat conductors.

It is another object of this invention to provide a food warmer that both illuminates and heats the foods held thereby.

It is another object of this invention to provide a food warmer that may be easily cleaned.

It is another object of this invention to provide a food warmer having removable trays for containers for the food products to be served therefrom, so that trays may be loaded while at the same time another is being actively used for sales.

The foregoing and other objects and advantages of this invention will appear from the description to follow. In the description reference is made to the accompanying drawings, which form a part hereof, and in which there is shown by way of illustration and not of limitation a specific form in which this invention may be embodied.

Figure 2:
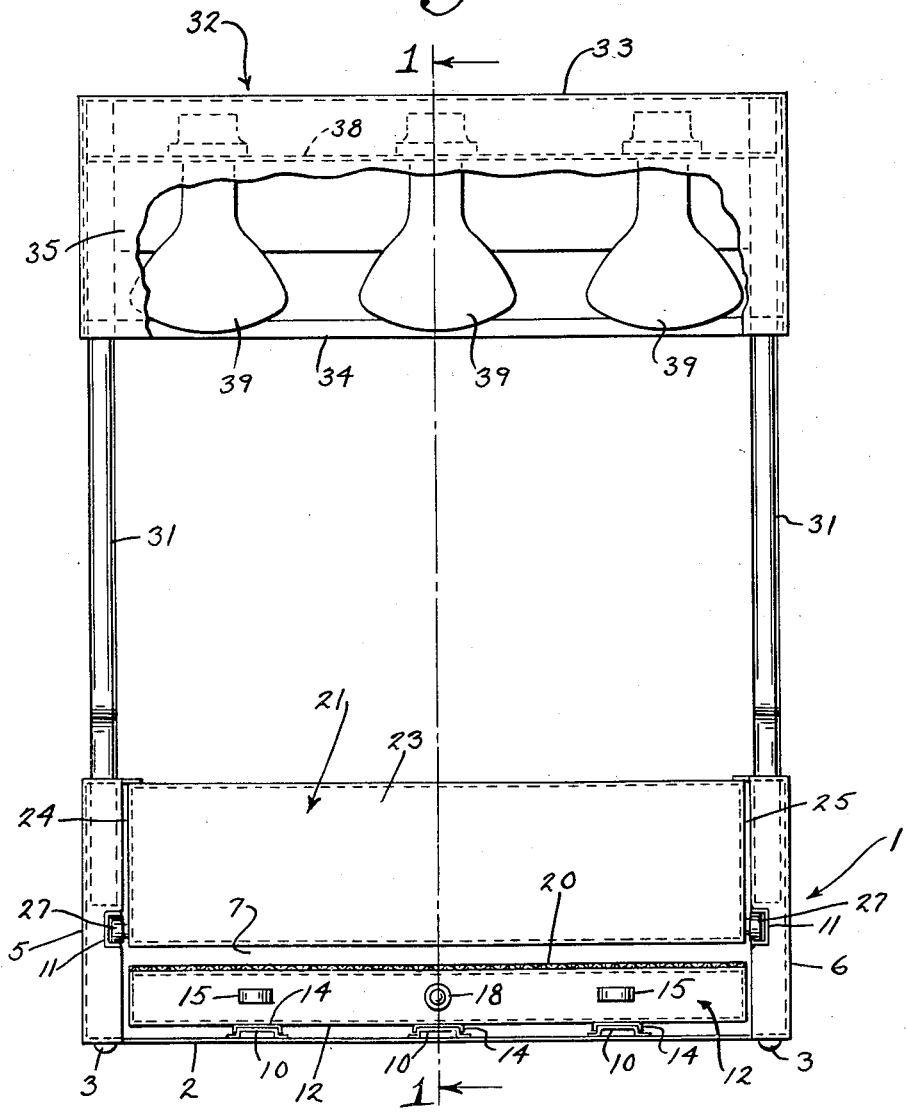

In the drawings:

Fig. 1 is a side view in elevation and in section of a food warming apparatus embodying the invention, Fig. 2 is a rear view in elevation of the apparatus shown in Fig. 1 with parts broken away and in section, Fig. 3 is a plan view of a removable tray forming a part of the apparatus, and in which parts are broken away and in section for the purposes of clarity, and Fig. 4 is a plan view of a heating element forming a part of the apparatus.

Referring now to the drawings, there is shown a boxlike base 1 having a bottom 2 standing upon a set of four rubber cushion-feet 3. A front wall 4 extends upwardly from the front edge of the bottom 2 with a slight forward incline, and extending rearwardly from the side edges of the front wall 4 is a pair of side walls 5 and 6. Each side wall 5, 6 extends upwardly from a side edge of the bottom 2 and the upper limits thereof are inclined upwardly to the rear, as is particularly shown in Fig. 1. The upper margins of the walls 4, 5 and 6 are turned inwardly to present a border for the open top of the base 1. The base 1 is also open at the rear.

Directly behind the front wall 4 is a partition 7, clearly shown in Fig. 1, which acts as a stop for removable elements of the apparatus, and also as a mounting for a female plug 8 to be connected to a power source through lead wires 9, a portion only of which is shown. As is particularly shown in Fig. 2, a set of three shallow inverted channels 10 are secured to the upper side of the bottom 2, as as to act as guide rails for a heater assembly in a manner hereinafter to be described. A second set of channels 11 are mounted on edge to the inside of the side walls 5, 6 to provide a set of guide tracks.

A heater assembly 12 having a rectangular frame 13 fits within the bottom of the boxlike base 1. A set or downwardly facing channels 14 that extend forwardly and rearwardly are attached to the bottom of the frame 13, and are spaced from one another so as to fit over the inverted channels 10 on the bottom 2. In this fashion the heater assembly 12 may be slid into the base 1 from the rear, and also removed therefrom, with a guided movement. To facilitate removal and replacement of the heater assembly 12 a pair of handles 15 are provided on the back of the frame 13.

A set of four cross braces 16 are spaced from one another and extend between the opposite sides of the frame 13 to support heating elements 17 of the resistance type. The elements 17 span the depth of the base 1 several times, to provide uniform heat across the entire area of the base 1, and a pilot lamp 18 is connected to one heating element 17 to indicate when the elements 17 are energized. A male plug 19 at the front of the frame 13 is joined to the elements 17 to supply power thereto, and is adapted to connect with the plug 8 upon insertion of the heater assembly 12 within the bottom of the base 1. To complete the heater assembly 12 a screen 20 covers the entire top thereof to protect the elements 17 from foodstuff and the like which may be dropped from containers to be used in conjunction with the apparatus. Such screen 20 is shown in Figs. 1 and 2, but has been broken away in Fig. 4 for the purpose of clarity.

Immediately above the heater assembly 12 is a removable tray 21. The tray 21 comprises a front wall 22, a rear wall 23 of greater height than the wall 22, and side walls 24, 25 extending between the side edges of the walls 22, 23 so as to form stiff rectangular structure open at the top and bottom. The upper margins of each of the walls 22–25, as well as the lower margins are turned inwardly to lend additional rigidity to the assembly, and the upper edges of the side walls 24, 25 incline downwardly from the rear at a slope that matches that of the side walls 5, 6 of the base 1. Each of the side walls 24, 25 includes an opening 26 to act as a handle for manipulating the tray 21 as it is inserted into and removed from the base 1. To orientate the tray 21 as it is removed from, or inserted into, the base 1, and also to aid in the handling of the tray 21, there are provided a set of six rollers 27 at the sides of the tray 21 which are adapted to ride in and be received by the channels 11 secured to the sides 5, 6 of the base 1.

The tray 21 is adapted to receive and hold a plurality of cup shaped containers 28, as is shown in Fig. 1. The bottoms of the containers 28 rest upon a grid 29 comprised of strands running both sidewardly and fore and aft. The grid 29 rises in a series of steps from the forward portion of the tray 21 to the rear, so that the containers 28 rise accordingly from the front to the rear, to enhance the servicing of customers for the food products to be dispensed from the apparatus. To retain the containers 28 in an orderly array, of rows both sideward and fore and aft, a second grid 30 is disposed in the top of the tray 21 at a substantial elevation above the grid 29. The strands comprising the grid 30 present a plurality of rectangular openings in which the containers 28 may be received. Such openings are of dimension that the containers 28 may be easily inserted and withdrawn therefrom, but are of small enough area to confine each of the containers 28 within a limited space so that an orderly array is maintained.

Extending upwardly from each side of the base 1 is a tubular support 31, which extends vertically for a slight distance, then turns at an incline to the front for a substantial extent of its length, and then to the vertical at its upper terminus. Extending between the supports 31, so as to be suspended thereby, is a hood 32 having a flat top portion 33 and downwardly flaring front and rear portions 34, 35. The front 34 includes an opening behind which is set a glass 36 upon which decorative designs or indicia may be placed to aid in the sale of merchandise vended from the apparatus of the invention. Immediately to the rear of the glass 36 is a fluorescent illuminating bulb 37. To the rear of the bulb 37 is a support bracket 38 running for the length of the hood 32 which mounts a set of three radiant heat lamps 39. The lamps 39 face downwardly such that radiant energy emitted therefrom is directed toward the base 1 and the food products in the containers 28 to be warmed by the apparatus. Connections and circuits for the lamps 39 and the bulb 37 are not shown, as the manner of connecting such elements is understood in the art.

In the use of the apparatus described a tray 21 is filled with containers 28, which in turn are filled with a dry food product such as popped corn. The tray 21 may be filled while it is in the base 1, or may be filled prior to insertion in the base 1. In any event, during peak sales periods a number of trays 21 may be advantageously employed by filling one while another is in the base 1 for immediate dispensing of the food product to customers.

With the tray 21 in place, in the base 1, the heating elements 17 as well as the radiant heat lamps 39 are energized. The resistance type heating elements 17 heat the air immediately surrounding the same and by convection heat is imparted to the bottom portions of the containers 28. The radiant heat lamps 39, on the other hand, transmit energy waves to the upper portions of the containers 28, which energy is transformed to heat upon the striking of the waves upon the foodstuff within the containers 28. By the employment of radiant heat lamps 39 the atmosphere about the upper portions of the containers 28 remains relatively cool, so that no discomforts are experienced by purchasers of the food products as they remove the containers 28 from the tray 21. Radiant energy of the lamps 39, which is not converted to heat directly within the foodstuffs of the containers 28, passes downwardly between the containers 28 to the interior of the base 1. Such energy waves strike the interior assemblage of the base 1 and heat is then evolved. Heating due to the waves is confined to within the base 1, so as to cause the base 1 to act as a warming or hot box that confines the heat in a manner most suitable for the warming of the food products within the containers 28. In this fashion efficient heating is carried out.

As is customary in the handling of merchandise by customers, food products will at times be dislodged from the containers 28 and fall therebetween. Such particles of food will fall upon the screen 20, which is well above the heating elements 17, and will not be burned or fried to a degree that unwanted odors are developed. So that the screen 20 may be readily cleaned the heater assembly 12 may be easily removed, as hereinbefore described, and then reinserted with ease, so that there is no undue complication in the use of the apparatus of the invention.

The invention is particularly adapted for the warming of foodstuffs served in containers of relatively elongated height, and wherein the food products are of a material that does not readily conduct heat. Popped corn is an example of such a material, for it is in of itself a rather efficient heat insulator. To heat such a food product the invention presents a lower heat box containing a heating element utilizing convection for obtaining a uniform temperature throughout the heat box which surrounds the bottom of the containers. The containers, however, rise above the boxlike base 1, with the greatest portion of their height projecting therefrom, so as to be readily displayed to prospective customers and to facilitate handling in self-service sales. In order that proper heat may be provided for retaining the entire column of each of the containers 28 at appropriate temperatures radiant heat lamps are employed which radiate downwardly upon the containers and the foodstuffs therein. Heat is then only evolved within the foodstuffs so that temperatures of the apparatus and the immediate ambient are not unnecessarily elevated. Also, as the containers are removed the space occupied thereby is not heated by the lamps 39. Instead, radiant energy is passed downwardly to within the base so that heat is evolved therein where it is entrapped for most effective use.

I claim:

1. In a food warmer the combination comprising a base having a bottom and side walls to present a box open at the top; an open grid in said box adapted to support a plurality of cups without any material blocking of the interior of the box from the exterior, said grid including a base portion defining a series of supporting steps adapted to support the bottoms of said cups in tiered relationship, the marginal edge defining the open top of the side walls of said box being in spaced vertical relationship relative to and above an adjacent supporting step of said grid; a heater within the box to heat the interior thereof; a supporting structure rising above the box; and radiant heat means carried by the supporting structure positioned to direct radiant energy through the grid toward the interior of the box.

2. In a food warmer the combination comprising a base having a bottom and side walls to present a box open at the top; an open grid in said box adapted to support a plurality of cups without any material blocking of the interior of the box from the exterior, said grid including a base portion defining a series of supporting steps and comprising a lower mesh adapted to support the bottoms of said cups in tiered relationship, the upper portion of said grid including a mesh with openings to allow the cups to pass therethrough and to be supported from tipping; a heater within the box to heat the interior thereof; a supporting structure rising above the box; and radiant heat means carried by the supporting structure positioned to direct radiant energy through the grid toward the interior of the box.

3. An apparatus in accordance with claim 2 wherein said grid comprises a removable tray slidable to the rear.

4. In a food warmer the combination comprising a base having a bottom and side walls to present a box open at the top; an open grid in said box adapted to support a plurality of cups without any material blocking of the interior of the box from the exterior said grid including a base portion defining a series of supporting steps adapted to support the bottoms of said cups in tiered relationship, the marginal edge defining the open top of the side walls of said box being in spaced vertical relationship relative to and above an adjacent supporting step of said grid; a supporting structure rising above the box; and radiant heat means carried by the supporting structure positioned to direct radiant energy through the grid toward the interior of the box.

5. In a food warmer the combination comprising a base having a bottom and side walls to present a shallow box open at the top; an open grid in said box adapted to support a plurality of cups without any material blocking of the interior of the box from the exterior said grid including a base portion defining a series of supporting steps adapted to support the bottoms of said cups in tiered relationship, the marginal edge defining the open top of the side walls of said box being in spaced vertical relationship relative to and above an adjacent supporting step of said grid; a heater within the box to heat the interior thereof; a screen disposed above the heater and beneath the grid; a supporting structure rising above the box; and radiant heat means carried by the supporting structure positioned to direct radiant energy through the grid toward the interior of the box.

6. In a food warmer the combination comprising a base having a bottom and side walls to present a box open at the top; a removable tray in said box that is open at the top and bottom and which has an open grid adapted to support a plurality of cups, which grid does not materially block the interior of the box from the exterior said grid including a base portion defining a series of supporting steps adapted to support the bottoms of said cups in tiered relationship; a heater within the box located beneath said tray to heat the interior thereof; a screen disposed above the heater and beneath the tray which is removable from said box together with said heater; a supporting structure rising above said box; and radiant heat means carried by the supporting structure positioned to direct radiant energy downwardly toward the box and hence through the grid over said tray to the interior of the box.

References Cited in the file of this patent

UNITED STATES PATENTS

| | | |
|---|---|---|
| 1,091,714 | Stanley | Mar. 31, 1914 |
| 1,282,195 | Crary | Oct. 22, 1918 |
| 1,514,375 | Crimmel | Nov. 4, 1924 |
| 1,535,638 | Wallman | Apr. 28, 1925 |
| 2,429,241 | Schuldiner | Oct. 21, 1947 |
| 2,434,166 | Klumpp | Jan. 6, 1948 |
| 2,738,410 | Ness et al. | Mar. 13, 1956 |